(12) United States Patent 
Boyer et al.

(10) Patent No.: US 7,097,703 B2
(45) Date of Patent: Aug. 29, 2006

(54) USE OF ANTI-STRIP AGENTS TO IMPROVE WEAR CHARACTERISTICS OF PAVEMENT SEALER

(75) Inventors: David C. Boyer, Huntington, WV (US); Patricia K. Doolin, Ashland, KY (US); Melvin D. Kiser, Huntington, WV (US)

(73) Assignee: Marathon Ashland Petroleum Co., Findlay, OH (US)

( * ) Notice: Subject to any disclaimer, the term of this patent is extended or adjusted under 35 U.S.C. 154(b) by 190 days.

(21) Appl. No.: 10/812,680

(22) Filed: Mar. 30, 2004

(65) Prior Publication Data

US 2005/0223941 A1  Oct. 13, 2005

(51) Int. Cl.
*C09D 195/00*  (2006.01)
(52) U.S. Cl. .................... 106/277; 106/278; 106/279
(58) Field of Classification Search .............. 106/277, 106/278, 279
See application file for complete search history.

(56) References Cited

U.S. PATENT DOCUMENTS

| | | | |
|---|---|---|---|
| 2,623,831 A | 12/1952 | Mikeska | |
| 2,673,164 A | 3/1954 | Hughes et al. | |
| 2,737,509 A | 3/1956 | Jelling | |
| 2,937,106 A | 5/1960 | Carpenter et al. | |
| 2,978,342 A | 4/1961 | Lefebvre | |
| 3,047,414 A | 7/1962 | Katz | |
| 3,085,891 A | 4/1963 | Butter | |
| 3,096,191 A | 7/1963 | Pitchford | |
| 3,096,192 A | 7/1963 | Pitchford | |
| 3,108,971 A | 10/1963 | Mertens | |
| 3,129,106 A | 4/1964 | Katz | |
| 3,347,690 A | 10/1967 | Galvin et al. | |
| 3,861,933 A | 1/1975 | Doi | |
| 3,928,061 A | 12/1975 | Hellsten et al. | |
| 3,963,509 A | 6/1976 | Doi et al. | |
| 4,036,661 A | 7/1977 | Graf et al. | |
| 4,038,096 A | 7/1977 | Graf et al. | |
| 4,038,102 A | 7/1977 | Hellsten et al. | |
| 4,173,489 A | 11/1979 | Crawford et al. | |
| 4,383,081 A | 5/1983 | Grossi et al. | |
| 4,430,127 A | 2/1984 | Dalter et al. | |
| 4,430,465 A | 2/1984 | Abbott | |
| 4,542,068 A | 9/1985 | Whichard | |
| 4,543,158 A | 9/1985 | Bondoc et al. | |
| 4,554,769 A | 11/1985 | Fujii et al. | |
| 4,567,079 A | 1/1986 | Canfield et al. | |
| 4,701,070 A | 10/1987 | Jelling | |
| 4,701,484 A | 10/1987 | Chang et al. | |
| 4,717,614 A | 1/1988 | Bondoc et al. | |
| 4,721,529 A | 1/1988 | Mullins | |
| 4,724,003 A | 2/1988 | Treybig et al. | |
| 4,743,304 A | 5/1988 | Gilmore et al. | |
| 4,755,545 A | 7/1988 | Lalwani | |
| 4,765,839 A | 8/1988 | Treybig et al. | |
| 4,781,490 A | 11/1988 | Jelling | |
| 4,786,329 A | 11/1988 | Chang et al. | |
| 4,789,402 A | 12/1988 | Kostusyk | |
| 4,795,661 A | 1/1989 | Bondoc et al. | |
| 4,806,166 A | 2/1989 | Schilling et al. | |
| 4,822,425 A * | 4/1989 | Burch ..................... 106/273.1 |
| 4,824,606 A | 4/1989 | O'Lenick, Jr. et al. | |
| 4,825,616 A | 5/1989 | Bondoc et al. | |
| 4,835,929 A | 6/1989 | Bondoc et al. | |
| 4,836,857 A | 6/1989 | Hopkins | |
| 4,839,404 A | 6/1989 | Chang et al. | |
| 4,851,500 A | 7/1989 | Lalwani et al. | |
| 4,867,750 A | 9/1989 | O'Lenick, Jr. et al. | |
| 4,886,554 A | 12/1989 | Woodring et al. | |
| 4,895,600 A | 1/1990 | Chang et al. | |
| 4,900,589 A | 2/1990 | Montgomery | |
| 4,917,764 A | 4/1990 | Lalwani et al. | |
| 4,923,712 A | 5/1990 | Gladfelter et al. | |
| 4,923,913 A | 5/1990 | Chich et al. | |
| 4,992,315 A | 2/1991 | Zickell et al. | |
| 5,011,726 A | 4/1991 | Chich et al. | |
| 5,017,230 A | 5/1991 | Hopkins et al. | |
| 5,055,135 A | 10/1991 | Grube et al. | |
| 5,110,674 A | 5/1992 | Grube et al. | |
| 5,110,726 A | 5/1992 | Ogden | |
| 5,164,002 A | 11/1992 | Ballenger, Jr. et al. | |
| 5,224,990 A | 7/1993 | Vicenzi et al. | |
| 5,234,494 A | 8/1993 | Swatzky et al. | |
| 5,267,809 A | 12/1993 | Allan | |
| 5,312,483 A | 5/1994 | Swatzky et al. | |
| 5,362,314 A | 11/1994 | Vicenzi et al. | |
| 5,511,899 A | 4/1996 | Pavelek, II | |
| 5,512,093 A | 4/1996 | Huege et al. | |
| 5,519,073 A | 5/1996 | van der Werff et al. | |

(Continued)

FOREIGN PATENT DOCUMENTS

WO  WO9856858  12/1988

OTHER PUBLICATIONS

D.G. Tunnicliff; Performance of antistripping additives; Association of Asphalt Paving Technologists Annual Meeting (Salt Lake City Mar. 17-19, 1997)/Proceedings of the Association of Asphalt Paving Technologists V66:344-78 (1997), Abstract.

(Continued)

*Primary Examiner*—David M. Brunsman
(74) *Attorney, Agent, or Firm*—Emch, Schaffer, Schaub & Porcello, Co., L.P.A.

(57) ABSTRACT

A sealer base comprising at least one anti-wear agent comprising aliphatic carboxylic acids and aliphatic polyamides is disclosed.

15 Claims, No Drawings

U.S. PATENT DOCUMENTS

| | | | |
|---|---|---|---|
| 5,545,278 | A | 8/1996 | Chen et al. |
| 5,558,702 | A | 9/1996 | Chatterjee et al. |
| 5,578,118 | A | 11/1996 | Shuey et al. |
| 5,618,132 | A | 4/1997 | Fogg et al. |
| 5,625,117 | A | 4/1997 | Henderson et al. |
| 5,626,658 | A | 5/1997 | McArdle |
| 5,660,498 | A | 8/1997 | Freeman |
| 5,667,576 | A | 9/1997 | Chatterjee et al. |
| 5,667,577 | A | 9/1997 | Chatterjee et al. |
| 5,667,578 | A | 9/1997 | Schilling |
| 5,670,562 | A | 9/1997 | Schilling |
| 5,772,749 | A | 6/1998 | Schilling et al. |
| 5,776,234 | A | 7/1998 | Schilling |
| 5,820,663 | A | 10/1998 | Miller et al. |
| 6,027,558 | A | 2/2000 | Little et al. |
| 6,267,809 | B1 | 7/2001 | Boyer et al. |
| 6,361,591 | B1 | 3/2002 | Boyer et al. |
| 6,383,365 | B1 | 5/2002 | Boyer et al. |

OTHER PUBLICATIONS

J.C. Peterson, H. Plancher; Model studies and interpretive review of the competitive adsorportion and water displacement of petroleum asphalt chemical functionalities on mineral aggregate surfaces; Petroleum Science and Technology (ISSN 10916466) V16 1-2:89-131 (Jan.-Feb. 1998); Abstract.

Somogyvari A P; Zanzotto L.; Jeffries R B; The anti-stripping properties of basic nitrogen in hydrocracked resid[ue]s; Fuel Science & Technology International (ISSN 0884-3759) V10 N.4-6 531-47 (May-Jul. 1992); Abstract.

R.C.G. Hass, E. Thompson, F. Meyer, G.R. Tessier; The Role Of Additives In Asphalt Paving Technology; Proc. Assoc. Asphalt Paving Technol. V.52 pp. 324-345 (1984) Abstract.

R.L. Dunning, G.O. Schulz and W.F. Gawron; Control Of Stripping With Polymer Treatment Of Aggregates; Asphalt Paving Technology, v.62, J. of the Assoc. of Asphalt Paving Technologists, From The Proceedings Of Technical Sessions; Austin, Texas; Mar. 22-24, (1993) Abstract.

H.W. Busching, J.M. Alewine, S.N. Amirkhanian, J.L. Burati and M.O. Fletcher; Effects Of Selected Asphalts And Antistrip Additives On Tensile Strength Of Laboratory-Compacted Marshall Specimens . . . A Moisture Study; Proc. Assoc. Asphalt Paving Technol. V.55 pp. 120-148 Assoc. Asphalt Paving Technol. Tech. Sessions (Clearwater Beach, FLA. Feb. 17-19, 1986) (1986) Abstract.

T.W. Kennedy, W.V. Ping; An evaluation of effectiveness of antistripping additives in protecting asphalt mixtures from moisture damage; Association of Asphalt Paving Technologists Meeting (Seattle Mar. 4-6, 1991) Proceedings of the Association of Asphalt Paving Technologist V60 230-63 (1991), Abstract.

Y.W. Jeon, C.W. Curtis, B.M. Kiggundu; An investigation of the effect of (precoating) antistripping (AnS) agents on silica adsorption of asphalt functionalities; Fuel Science and Technology International (ISSN 0884-3759) V8 N.3 241-70 (1990), Abstract.

A.R. Tarrer and V.P. Wagh; Innovative tests to predict the strength and type of asphalt-aggregate bonds; ACS Division of Petroleum Chemistry Preprints V35 N.3 361-69 (Jul. 1990); Abstract.

C. Giavarini and G. Rinaldi; Development of new adhesion agents for asphalt cement; Ind. Eng. Chem. Res. (ISSN 0888-5885) V28 N.8 1231-36 (Aug. 1989); Abstract.

I. Ishai, Y.A. Tuffour; The use of propane-precipitated asphalt (PPA) in bituminous paving mixtures; Assoc. Asphalt Paving Technol. Tech. Sessions (Reno, NV Feb. 23-25, 1988) Proc. Assoc. Asphalt Paving Echnol. V56-599-631 (1987), no month provided Abstract.

Rohm and Haas Company; Pave® 192 Asphalt Additive; (Jul. 1999) 4 pages.

Morton Material Safety Data Sheet; Pave® 192 Asphalt Additive; (Apr. 7, 1999) 6 pages.

\* cited by examiner

USE OF ANTI-STRIP AGENTS TO IMPROVE WEAR CHARACTERISTICS OF PAVEMENT SEALER

FIELD OF THE INVENTION

The invention relates to a sealer for asphalt pavement or metal surfaces having an anti-wear agent therein for improving wear characteristics.

BACKGROUND OF THE INVENTION

Description of the Prior Art

There are two basic types of driveway or pavement sealer—coal tar based and asphalt based. These materials are primarily used to seal driveways and other pavement surfaces, but can also be used to seal or coat metal, wood, or cementitious surfaces, e.g., pipe coatings.

Coal tar is the premier product and has the largest market share. Driveway sealer made from coal tar is an emulsion of water, coal tar pitch, clay and water, perhaps with emulsifier and optional ingredients such as sand. These materials are long lasting, have a pleasing black color and resistance to gasoline and kerosene spills but have an objectionable odor during application and contain aromatic compounds.

Asphalt based materials are made from distilled petroleum fractions, typically vacuum tower bottoms or perhaps atmospheric tower bottoms. These heavy hydrocarbon fractions are sometimes oxidized or "blown" to change the asphalt properties. Asphalt based sealers do not smell as much as the coal tar based materials and are able to withstand a wider range of temperatures. The asphalt sealers are not as toxic and in some areas only asphalt-based sealers are sold. Asphalt sealers do not have the black color desired by many users. Asphalt sealers do not last as long, and frequently must be reapplied every year or every two years.

The goal of the present invention is to provide a low softening point pitch product similar to coal tar sealer base with similar physical properties such as viscosity and softening point and with improved wear characteristics. With that goal in mind, some of the closest art known is reviewed hereafter. The art review can be arbitrarily grouped into five areas:

A. Coal tar driveway sealer
B. Blends of coal tar pitch/petroleum
C. Control of pitch production
D. Low softening point pitches
E. Blends of petroleum/petroleum solvent-based sealer.

Coal Tar Driveway Sealer Art

U.S. Pat. No. 4,222,916, Hergenrother discloses a coal tar based sealer with acrylate emulsion.

U.S. Pat. No. 4,537,635 Bart et al, teaches driveways sealers from oxidized coal tar.

U.S. Pat. No. 4,052,290, Cushman et al., teaches oxidizing or air-blowing of asphalt.

U.S. Pat. No. 4,537,635, Bart et al., teaches driveways sealers from oxidized coal tar.

U.S. Pat. No. 5,558,702, Chatterjee et al., taught use of asphalt emulsions to "avoid the use of coal tar and its derivative".

U.S. Pat. No. 5,667,576, Chatterjee et al. taught forming an asphalt emulsion from AC-20 asphalt and an emulsifier and mixing with varying amounts of a lime/clay/sand/carbon black mixture.

As stated previously, most driveway sealer is either a premium product based on coal tar or a coal tar free, asphalt based product, which lasts for a year. An additional concern is that coal tar based driveway sealers comply with the specifications for coal tar based sealers disclosed in ASTM D3320, Emulsified Coal Tar Pitch (Mineral Colloidal Type), and Federal Specification R-P=355e, Pitch, Coal Tar Emulsion (Coating for Bituminous Pavements), which specify use of coal tar pitch. Although coal tar/petroleum pitch blends are not used commercially in driveway sealers, there have been reports of pitch blends for other uses, reviewed next.

Blends of Coal Tar Pitch/Petroleum

For Aluminum anode binder pitch, reviewed in greater length hereafter, it has been common to "extend" the coal tar pitch by blending in up to 10% petroleum pitch, so that the pitch used was a 90:10 blend of coal tar: petroleum pitch. Some uses of petroleum pitch as an extender for driveway sealer may have occurred but they have not been reported in the literature.

Blends of coal tar with petroleum pitch are known in the art, but not for driveway sealer. This art, reviewed hereafter, is believed to be the closest to the low softening point petroleum pitch of the present invention. U.S. Pat. No. 5,746,906 McHenry, et. al. disclosed a coal tar pitch/petroleum pitch blend and method of making it. A crude coal tar material is selected according to specific properties including QI, specific gravity, water and ash content. A petroleum pitch material is also selected according to its softening point, QI, coking value and sulfur content. The coal tar pitch is distilled to an uncharacteristically high softening point then mixed with a lower softening point petroleum pitch to a desired softening end point. The material retains significant QI and coking value characteristics of pure coal tar pitch particularly for use in Soderberg-type anodes for aluminum smelting as well as electric arc furnace electrodes. PAH emissions, and more specifically B(a)P equivalent emissions, are all reduced by approximately 40%.

The petroleum pitch used in '906 had a softening point of 80° C. nominal. This was mixed with coal tar pitch distilled to have a softening point of 130–175° C.

Control of Pitch Production

Control of coal tar pitch fractionation is described in U.S. Pat. No. 4,066,159.

Control of petroleum pitch fractionation is straightforward distillation.

It is easy to run any pitch fractionation process to produce a product with the desired softening point and this is the norm for most pitches, both coal tar and petroleum.

Low Softening Point Pitch

Some coal tar pitch materials are made with a relatively low softening point. For driveway sealer use, the coal tar pitch will typically have a softening point of around 40° C., as discussed in the driveway sealer art. Some lower softening point petroleum pitches, which are solids at room temperature have been made by producing a high softening point material, e.g., A240, and blending this with cutter stock such as aromatic oil. It is possible to take A-240 pitch and cut it back with aromatic cutter oil to produce a nominally "solid" pitch specialty product having a low softening point. Some physical properties of various commercial petroleum pitch products are summarized in the following section.

TABLE 1

Specifications and Typical Properties of
Marathon Ashland Petroleum Pitch
CAS Number 68334-31-6

| Analysis | Test Method | A170 Pitch | A240 Pitch | A225 Pitch |
|---|---|---|---|---|
| Specification Points | | Limits | | |
| Softening Point, Mettler ° C. | ASTM D3104 | 79.4–82.6 | 118–124 | 105–110 |
| Softening Point, Ring & Ball ° F. | ASTM D36 | 166–171 | 235–248 | 212–221 |
| Flash, Cleveland Open Cup, ° C. minimum | ASTM D92 | 200 | 270 | 260 |
| Coking Value, Modified Conradson Carbon, wt %, minimum | ASTM D2416 | NA | 49 | 46 |
| Sulfur Content, wt %. maximum | ASTM D1552 or D4294 | NA | 3.0 | 1.5 |
| Typical Properties | | Values | | |
| Specific Gravity, Helium Pycnometer, g/cc, minimum | ASTM D71 | 1.18 | 1.22 | 1.22 |
| Moisture, wt %, maximum | — | — | 0.5 | — |
| Toluene Insolubles, wt %, minimum | ASTM D4072 | — | 2.10 | 2.10 |
| Quinoline Insolubles, wt % maximum | ASTM D 2318 | 0 | 0.5 | 0.5 |

The above pitches, all solids at room temperature, were made from a direct thermal process or blending A240 with an appropriate cutter oil. A pourable pitch product, one suitable for use in driveway sealers or industrial coatings, has been made from blends of A240 and #6 fuel oil. The driveway sealer usually contains a surfactant or other emulsifier, which would be expected to prevent phase incompatibility problems.

Blends of Petroleum/Petroleum Solvent-Based Sealers

Blends of petroleum based and coal tar based components that contain petroleum solvent have been made by the assignee of the present invention herein, Marathon Ashland Petroleum, LLC. U.S. Pat. No. 6,383,635 was directed to a petroleum pitch having a high softening point petroleum pitch above 100° C. and a petroleum solvent having less than 10 weight percent material boiling below 300° C. where the petroleum pitch is 45–55 weight percent and the petroleum solvent is the remaining 55–45 percent, based on the total weight of pitch and solvent.

U.S. Pat. No. 6,267,809 was directed to a method of increasing wear resistance of driveway sealer by mixing a petroleum pitch with an aromatic rich cut back oil containing at least 60 weight percent aromatic to produce a pourable pitch component with a softening point below 50° C. The patent '809 is also directed to a driveway sealer having such composition wherein the driveway sealer exhibits an increase in wear resistance of at least 50 percent compared to a like driveway sealer product made from a petroleum pitch component comprising a blend of petroleum pitch having a softening point above 100° C. and #6 fuel oil or other low aromatic cutback oil with less than 50 weight percent aromatics.

U.S. Pat. No. 6,361,591 was directed to a binder or sealer base comprising a coal tar pitch obtained as the residue product of distillation or heat treatment of coal tar, or coal or petroleum pitch obtained as a residue product from heat treatment in distillation of petroleum fractions, which is a solid at room temperature, consists of a complex mixture of numerous predominantly aromatic and alkyl-substituted aromatic hydrocarbons, and exhibits a broad softening point range instead of a defined melting point, both of which coal tar and petroleum pitch materials are solid at room temperature; asphalt obtained by atmospheric or vacuum distillation of a hydrocarbon fraction containing asphaltic components; and, cut-back oil comprising a refinery liquid hydrocarbon stream selected from the group of FCC, light cycle oil, FCC heavy naphtha, FCC slurry oil or clarified slurry, gas oil, vacuum gas oil, coker naphtha, coker gas oil, fuel oil and aromatic extract.

Each of these Marathon Ashland Petroleum patents, '365, '809 and '591, describes the use of an organic anti-stripping agent comprising amines and amine salts for asphalt mixtures. The '365, '809, and '591 patents generally describe the use of the amine salt anti-strip agents to provide adhesiveness to asphalt mixture. It is noted that the amines are basic and are derived from ammonia.

It was not until the present invention that we discovered that a significant improvement in the wear characteristics of a different type of product, pavement sealer containing petroleum based and coal tar based components, is observed by the addition of an anti-wear agent comprising a mixture of alphatic carboxylic acids and aliphatic polyamides.

Amides are neutral compounds and the amide linkage is planar which generally provides free rotation around the C—N bond. Amides are derivatives of carboxylic acids and are generated by replacing the OH of the acid with an $NH_2$.

It is to be noted that unlike amines, amides are non-basic. This is because the amide's carbonyl group is very electronegative and is believed to tighten the electrons on N so that it is unable to accept a proton.

The anti-wear agent also includes carboxylic acids which can include fatty acids, lipids fats and oils. Thus, while not wishing to be bound by theory it is believed that the polyamide-carboxylic acid anti-wear agent, as a whole, is acidic which provides a positive cationic charge so that the anti-wear agent material is attracted to aggregates that exhibit negative (amionic) behavior, such as limestone. It is further surprising that an improvement in wear resistance is noted in both the presence and absence of water.

We discovered that a petroleum pitch-solvent-aliphatic carboxylic acids+polyamides "sealer base" or "binder" material could be used to produce a product having ideal characteristics for driveway sealers. It is surprising that such material could produce essentially the same desired characteristics as a cold tar pitch material with the exception of greatly improved wear characteristics. The incorporation of the anti-wear material produces a premium quality product which meets all the specifications of fuel or coal tar based driveway sealers. Since the "sealer base" or "binder" material contains petroleum pitch, the material has a somewhat reduced carcinogen level and somewhat reduced odor as compared to coal tar pitch materials.

We also discovered an unexpected increase in improved wear characteristics after the pavement sealer has been subjected to water conditioning.

BRIEF SUMMARY OF THE INVENTION

Accordingly, the present invention provides a sealer having a Mettler softening point of 35–45 C., comprising a high softening point petroleum pitch having a softening point above 100 C., a petroleum solvent having less than 10 wt % material boiling below 300 C., a coal tar material, and an anti-wear material.

In another embodiment, the sealer can comprise from about 45 to about 70 weight percent petroleum pitch material and about 30 to about 55 percent solvent material to form a petroleum component wherein the amount of petroleum component ranges from about 20 to about 55 percent by weight and the amount of coal tar ranges from about 50 to about 80 percent by weight, and from about 0.25 to about 1.0 weight percent of aliphatic carboxylic acid—aliphatic polyamide anti-wear agent is added to the blend of petroleum component/coal tar material.

DETAILED DESCRIPTION

For clarity, and to avoid the confusing terminology used in many patents, several terms will be defined. This "definition" section is intended as an overview, with detailed specification for each material provided later.

Driveway sealer means a driveway or paving sealer comprising:
water,
clay,
emulsifier and
"sealer base" or "binder".

The "sealer base" or "binder" is the hydrocarbon portion of the driveway sealer. This bonds with or acts as a "binder" for the pavement or driveway. Sealer base of the prior art was either based on coal tar pitch for coal tar based driveway sealers or an asphalt obtained by distillation for prior art asphalt driveway sealers.

Sealer base or "binder" of the invention comprises a blend of:
i) a petroleum component comprising: high softening point petroleum pitch which is a solid at room temperature and a solvent;
ii) a coal tar material; and
iii) at least one anti-wear agent.

In another embodiment, the sealer base comprises a low softening point pitch prepared by direct distillation.

Driveway sealers of the invention, and the sealer base material from which the driveway sealer is made, may be blends of coal tar pitch and petroleum pitch. Pitch is defined below.

In other embodiments the "sealer base" or "binder" comprises a blend of coal tar and at least one anti-wear agent.

Petroleum pitch is a residue from heat treatment and distillation of petroleum fractions. It is a solid at room temperature, consists of a complex mixture of numerous predominantly aromatic and alkyl-substituted aromatic hydrocarbons, and exhibits a broad softening point range instead of a defined melting point.

In certain embodiments, the petroleum solvent compries at least one cut-back oil which is normally a liquid hydrocarbon stream and the petroleum solvent comprises a which is compatible with both the pitch and the asphalt fraction. There are many normally liquid hydrocarbon streams in a refinery ranging from naphtha fractions to heavy liquids, which are only distillable under a vacuum, e.g., vacuum gas oil. Preferred streams are aromatic extracts, cycle oil and slurry oil from FCC columns, and coker gas oils. Low value heavy fuels, complex blends of heavy liquid refinery products, may be used in some applications though some testing is advised because the quality and characteristics of the heavy fuel oils are so variable.

In our process, the petroleum pitch is produced with a softening point much above that which could be tolerated in the sealer base, and diluted with a controlled amount of cutter solvent or cut-back oil.

Emulsifier means a surfactant, detergent or dispersing agent added to help mix the oil of the sealer base with water to form an emulsion. Use of emulsifiers is well known.

Clay is an essential and well known part of the driveway sealer. The sealer may contain sand, carbon black or other colorants, plastics, thickeners, anti-stripping agents and the like.

More details will now be provided about each component.

Each part of the sealer base or "binder" of the invention will now be reviewed in depth, namely the A 40 pitch (A 240 and cut-back oil), the B40 pitch (solvent deasphalt bottoms and aromatic extract) and C40 pitch (A-240 pitch and aromatic extract) and the coal tar pitch material and other ingredients added to sealer base or need to make driveway sealers. After this review of the individual components, preferred ratios or blends of various materials will be reviewed, including a brief discussion of some conventional additives for driveway sealer (clay, sand, colorants, and the like) and other sealer applications. This is followed by a review of precautions that need to be taken to get sealer base to the driveway sealer manufacturing facility without phase separation.

Pitch

The pitch component can be any pitch material meeting the specifications summarized at the end of this section. The pitch can be derived from coal, petroleum or even wood. In most commercial uses, either coal tart pitch or petroleum pitch will be used.

Coal tar pitches, when desired, may be made using the method and apparatus of U.S. Pat. No. 4,066,159, METHOD AND APPARATUS FOR THE CONTROL OF PITCH STILL OPERATION. An oxidized coal tar distillation cut may also be used, as disclosed in U.S. Pat. No. 4,537,635. Coal tar pitch is a beneficial but optional component.

Petroleum pitches may be made using the method disclosed in U.S. Pat. No. 4,671,848 (Ashland), U.S. Pat. No. 4,243,513(Witco), U.S. Pat. No. 3,140,248 (Mobil).

Eminently suitable for use herein are the petroleum pitch products available from Marathon Ashland Petroleum A 240 pitch with cutter stock, with the petroleum pitch comprising 45–55 wt % of the blend. The material should be blended to have a softening point of 35–45° C., and preferably has a softening point of 40° C.

Cut-Back Oil

There are a variety of refinery liquid hydrocarbon streams which can be used, though not necessarily with the same results. These include:
FCC light cycle oil
FCC heavy naphtha
FCC slurry oil, or clarified slurry oil
Gas oil
Vacuum Gas Oil
Coker naphtha
Coker gas oil
Fuel oils (#6, #2, #5, bunker, etc.)
Aromatic extracts A flash point specification or phase compatibility limit usually sets the minimum boiling point, or front end volatility of such streams.

In general, heavy liquid hydrocarbon streams are better "co-solvents" or cut-back oils than light liquid hydrocarbon streams.

In general, highly aromatic streams are better solvents for the condensed, multi-ringed aromatic structures which make up both the pitch and asphaltic fractions.

Such materials are well known and widely sold, and further discussion thereof is not necessary as one could go to a refinery and purchase these streams.

Critical cutback oil properties are somewhat dictated by the initial softening point of the pitch, but in general for the examples specified are:

Cleveland Open Cup Flash (COC) of 270–400° F.

Viscosity, Fural @ 122° F. of between 20–50 seconds

In certain embodiments, cutback oils are preferentially aromatic in nature to provide the best solvency to the system. Aliphatic oils may produce a silvery sheen due to incapability with the highly aromatic pitch. However, use of pure distillate streams as cutter oils instead of slurry oil or fuel oils which are produced from cracking processes would produce additional improvement in environmental impact, in addition to replacing coal tar with either petroleum pitch and/or asphalt if found to be sufficiently compatible.

Coal Tar

Coal tar pitch is a residue produced by distillation or heat treatment of coal tar. It is also solid at room temperature, consists of a complex mixture of numerous predominantly aromatic hydrocarbons and heterocyclics, and exhibits a board softening point range. Unlike petroleum pitch, coal tar pitch contains small carbon particles known as primary quinoline insolubles. Ref. Introduction to Carbon Technologies, Editors H. Marsh, E. A. Heintz, F. Rodriquiez-Reinoso, Secretariado de Pulbicaciones, 1997. Wood tar pitch, never used in driveway sealers, has been made for millennia by "cooking" pine oil or the liquid recovered during charcoal manufacture. All these materials, whether derived from coal tar, petroleum or wood, are "pitch" for the purposes of the present invention.

Coal Tar/Petroleum Pitch Ratios

In certain embodiments, the process and sealer of the present invention may include some pure coal tar pitch or a mixture of coal tar pitch and petroleum pitch, when the odor or toxicity of the coal tar pitch can be tolerated.

When large amounts of coal tar based sealer can be tolerated, the component may be a blend of 40–95 wt %, preferably 50–75 wt % of the total pitch component. A blend of 25–50 wt % petroleum pitch and 50–75 wt % coal tar pitch gives good results.

Anti-Wear Agent

The anti-wear agent promotes the useful life of the sealer product. The anti-wear material can be added at relatively low temperatures, for example ranging from 325 to 350° F. to the petroleum product/coal tar blend. In a preferred embodiment the anti-wear agent is generally present at about 0.25 to about 1.0 percent by weight of the sealer and, in the certain preferred embodiments, about 0.5 weight percent.

The inventors herein surprisingly found that a mixture of an aliphatic carboxylic acids and aliphatic polyamides (produced by Rohm and Haas Company under the term "Pave 192") improves the wear characteristics of pavement sealer. While such "Pave 192" material has been used as an asphalt additive, it has not been thought to be suitable in a driveway sealer product since asphalt products and driveway sealer products have different chemistries and different desired properties.

Binder (Sealer Base) Properties

TABLE 2

| Property | Test | End Point |
| --- | --- | --- |
| Float Test @ 50° C., sec | ASTM D 139 | 170–280 |
| Distillation wt % | ASTM D 20 | |
| 0–170° C. | | 0.0 |
| 0–270° C. | | 1.2 max |
| 0–300° C. | | 3.5 max |
| Softening Point of Residue @ 300° C. R&B, ° C. | ASTM D 36 | 45–55 |
| Flash Point, COC, ° C. | ASTM D 92 | 167 min |

Many of these properties are specified for safety (flash point) or ability to work with these materials in the field (viscosity).

Additives

There are some additional components which are preferred for sealer base and also for generalized sealing, such as coating metal surfaces. These materials are commercially available and per se form no part of the present invention.

The filler can be any suitable filler composition and can be selected from the group consisting of clay, Gibsonite, and tar sands. Filler is present in the asphalt sealing compositions of the present invention in amounts ranging from 30 to 40 wt %, preferably 30 to 35 wt %.

Suitable emulsifying agents can include aqueous polyvinylalcohol, aqueous amines, aqueous compounded amines such as those available from Akzo Chemicals and sold under the trade name Redicote (i.e., Recicote E-9) or those available from B.F. Goodrich Chemical Co. and sold under the trade name Carbopol; and aqueous solutions of aliphatic fatty acids and caustic (usually sodium hydroxide). Exemplary amines are commercially available primary aliphatic amines, trimethylaminediamines such as N-alkyl trimethylenediamine, polyethoxylated aliphatic amines and diamines ($C_8$ to $C_{18}$), amine acetate salts derived from primary, secondary or tertiary amines with the alkyl group ranging from $C_8$ to $C_{18}$, high molecular weight aliphatic primary, secondary or tertiary amines ($C_8$ to $C_{18}$), and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the trade name Ethofat and other commercially available fatty acid, tall oil and tallow or animal fat ($C_{16}$ to $C_{18}$) based cationic emulsifiers. Emulsifiers are present in the asphalt sealing compositions in amounts ranging from 1 to 10 wt %, preferably from 2 to 5 wt %, say about 1 to 3 wt % based on 100%.

The appearance-enhancing additive can be selected from the group consisting of tallow, carbon black, dyes, and pigments.

Appearance-enhancing additive is present in the asphalt sealing compositions in amounts ranging from 0.5 to 10 wt %, preferably from 1 to 5 wt %, based on 100%.

Sealers for Metal Surfaces/Waterproofing

In addition to use as a driveway sealer, the sealer base may be used as is or modified to permit use for pipe coating or the like. The material may also be used as a waterproofing agent for wood, metal and cementitious materials.

In some instances, coating materials are used in neat form to paint or spray on wood, metal, or cementitious materials. Water or clay may be optional.

EXAMPLES

Laboratory blends of potential pavement sealer components were produced. These blends are mixtures of petroleum based pitch and cutter oil combinations. Table 3 details the composition and properties of A 40, B 40 and C 40 pavement sealer components.

K-364 coal tar sealer for evaluation with a 25 wt %/75 wt % petroleum-coal tar blend ratio. One additional blend of B40 and K-364 was made at a 50/50 wt.wt. blend ratio. Composition and concentration are detailed in Table 4.

TABLE 4

Composition of Petroleum/Coal Tar Pavement Sealer Blends Prior To Addition of Anti-Strip Agent

| Petroleum Component | Amount of Petroleum Component, wt % | Amount of Koppers K-364 Coal Tar Pavement Sealer, wt % |
|---|---|---|
| C40 | 25 | 75 |
| A40 | 25 | 75 |
| B40 | 50 | 50 |
| B40 | 25 | 75 |
| None | 0 | 100 |

After blending, 0.5 wt % of an anti-wear material, which comprises aliphatic carboxylic acids and aliphatic polyamides, was added to each blend. In certain embodiments, an especially useful anti-wear material is the PAVE® 192 material available from the Rohm and Hass Company.

The addition of anti-wear to the hydrocarbon blend was made at relatively low temperatures (325 to 350° F.).

Screening data, including scrub tests performed on the pavement sealers, are described in Table 5. The 2550–120E (Koppers neat coal tar plus PAVE 192 material) was used as a control sample. A direct comparison of the effect of the addition of PAVE 192 asphalt anti-wear agent is noted for three of the blends and shown in Table 5.

TABLE 3

Composition of and Properties of Pavement Sealer Components

| | A40 | | B40 | | C40 | |
|---|---|---|---|---|---|---|
| | Product | Concentration Wt % | Product | Concentration Wt % | Product | Concentration Wt % |
| | | | Blend Composition | | | |
| Pitch | A240 Pitch | 55 | SDA Btms (SP 200° F.) | 70 | A240 Pitch | 47 |
| Cutter Oil | #6 Fuel | 45 | 325 Aromatic Extract | 30 | 325 Aromatic Extract | 53 |
| | | | Blend Properties | | | |
| Softening Point, Mettler, ° C. | | 40.3 | | 42.8 | | 39.8 |
| Float @50° C. | | 242 | | 286 | | 258 |

Blends of these pavement sealer components and neat Koppers K 364 coal tar based pavement sealer were made. Three blends of A40, B40 and C40 were made with Koppers The anti-wear containing sealer base had greatly improved scrub test results, especially after being cured for 72 hours after water conditioning.

TABLE 5

Comparison of Wear Characteristics of Pavement Sealers, With and Without Anti-Strip Agent Blends of A40/Koppers K-364 coal tar
25 wt % A40/75 wt % Koppers K-364

| Concentration of PAVE 192 as the anti-wear material, wt % | Viscosity Brookfield @25° C. cps | Appearance Color | Cured Film Color | Cured Film Texture | Scrub Test - Number of Cycles for 75% Film Removal Cured for 72 hours | Scrub Test - Number of Cycles for 75% Film Removal Cured for 72 hours after water conditioning |
|---|---|---|---|---|---|---|
| 0.0 | 9,100 | Dark Brown | Dark Brown | Smooth | 12,042 | 189 |
| 0.5 | 13,833 | Dark Brown | Flat Black | Smooth | >12,000 | >12,000 |

Blends of B40/Koppers K-364 coal tar
25 wt % B40/75 wt % Koppers K-364

| Concentration of PAVE 192 as the anti-wear material, wt % | Viscosity Brookfield @25° C. cps | Appearance Color | Cured Film Color | Cured Film Texture | Scrub Test - Number of Cycles for 75% Film Removal Cured for 72 hours | Scrub Test - Number of Cycles for 75% Film Removal Cured for 72 hours after water conditioning |
|---|---|---|---|---|---|---|
| 0.0 | — | — | — | — | — | — |
| 0.5 | 14,633 | Dark Brown | Flat Black | Smooth | >12,000 | >12,000 |

50 wt % B40/50 wt % Koppers K-364 coal tar

| Concentration of PAVE 192 as the anti-wear material, wt % | Viscosity Brookfield @25° C. cps | Appearance Color | Cured Film Color | Cured Film Texture | Scrub Test - Number of Cycles for 75% Film Removal Cured for 72 hours | Scrub Test - Number of Cycles for 75% Film Removal Cured for 72 hours after water conditioning |
|---|---|---|---|---|---|---|
| 0.0 | 10,307 | Gray | Black | Smooth | 6,383 | 1,459 |
| 0.5 | 15,100 | Gray | Flat Black | Smooth | >12,000 | >12,000 |

Blends of C40/Koppers K-364
25 wt % B40/75 wt % Koppers K-364

| Concentration of PAVE 192 as the anti-wear material, wt % | Viscosity Brookfield @25° C. cps | Appearance Color | Cured Film Color | Cured Film Texture | Scrub Test - Number of Cycles for 75% Film Removal Cured for 72 hours | Scrub Test - Number of Cycles for 75% Film Removal Cured for 72 hours after water conditioning |
|---|---|---|---|---|---|---|
| 0.0 | 9,800 | Dark Brown | Dark Brown/Black | Smooth w/light texture | 3,450 | 324 |
| 0.5 | 15,100 | Dark Brown | Flat Black | Smooth | >12,000 | >12,000 |

Blends of Koppers K-364 (No Petroleum Component)

| Concentration of Morton PAVE 192 Anti-Strip, wt % | Viscosity Brookfield @25° C. cps | Appearance Color | Cured Film Color | Cured Film Texture | Scrub Test - Number of Cycles for 75% Film Removal Cured for 72 hours | Scrub Test - Number of Cycles for 75% Film Removal Cured for 72 hours after water conditioning |
|---|---|---|---|---|---|---|
| 0.0 | — | — | — | — | — | — |
| 0.5 | 14,533 | Dark Brown | Flat Black | Smooth | >12,000 | >12,000 |

DISCUSSION

The anti-wear container sealer of the invention, a new "sealer base", is compatible with and may be a partial or complete replacement for the coal tar based products currently used to make finished driveway sealer and other sealers. Thus no change is needed in manufacturing or storage procedures.

The use of petroleum pitch permits the valuable and dwindling supply of coal tar pitch to be extended or diverted to other uses. The finished driveway sealer product of the present invention can equal or at least approach very closely a pure coal tar based driveway sealer, and will be far superior to the conventional driveway sealer materials and will be significantly less toxic than the coal tar materials.

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

We claim:

1. A sealer base comprising:
   i) a petroleum pitch composition having a Mettler softening point of 35–45° C., comprising:
      a. a high softening point petroleum pitch having a softening point above 100° C.
      b. a petroleum solvent and wherein
      c. the petroleum pitch composition is 45–75 wt % and the petroleum solvent is the remaining 25–55 wt %, based on the total weight of the pitch and the solvent
   ii) coal tar; and
   iii) at least one anti-wear agent comprising aliphatic carboxylic acids and aliphatic poly amides.

2. The sealer base of claim 1 wherein the high softening point pitch composition has a softening point of 240° F.

3. The sealer base of claim 1 wherein the solvent is a cut back oil.

4. A sealer and/or waterproofing material comprising the composition of claim 1.

5. The sealer base of claim 1 wherein the coal tar pitch has a Mettler softening point of 35–45° C., and wherein the petroleum pitch composition comprises at least 25 wt % of the total amount of petroleum pitch and coal tar pitch.

6. A sealer comprising an emulsion of water, clay and sealer base of claim 1.

7. The sealer of claim 6, wherein the sealer has an increase in wear resistance when cured for 72 hours after water conditioning as compared to a driveway sealer having no anti-wear agent.

8. A binder or sealer base comprising:
   a coal tar pitch obtained as the residue product of distillation or heat treatment of coal tar, or coal or petroleum pitch obtained as a residue product from heat treatment and distillation of petroleum fractions, which is a solid at room temperature, consists of a complex mixture of numerous predominantly aromatic and alkyl-substituted aromatic hydrocarbons, and exhibits a broad softening point range of a defined melting point, both of which coal tar and petroleum pitch materials are solid at room temperature,
   cut-back oil comprising a refinery liquid hydrocarbon stream selected from the group of FCC, light cycle oil, FCC heavy naphtha, FCC slurry oil, or clarified slurry, gas oil, vacuum gas oil, coker naphtha, coker gas oil, fuel oil and aromatic extract, and
   an anti-wear agent comprising aliphatic carboxylic acids and aliphatic polyamides.

9. The binder of claim 8 wherein the pitch is coal tar pitch.

10. The binder of claim 8 wherein the pitch is petroleum pitch.

11. The binder of claim 8 wherein the pitch is a blend of petroleum and coal tar pitch.

12. The binder of claim 8 wherein the pitch has a softening point above 40° C.

13. The binder of claim 8 wherein at least 0.5 wt % anti-wear agent is present in the sealer base and in an amount sufficient to increase by at least 50% the durability of the sealer in a scrub test as compared to an anti-wear agent free material.

14. Driveway sealer emulsion of water, clay and sealer base wherein said sealer base comprises a blend of:
   petroleum or coal tar pitch or a blend thereof with a softening point above 40° C.,
   cut-back oil, and
   an anti-wear agent comprising aliphatic carboxylic acids and aliphatic polyamides,
   wherein the sealer base has a Brookfield viscosity of 100 centipoise.

15. A method of increasing the wear resistance of driveway sealers containing water, clay, emulsifier and a petroleum pitch component with a softening point below 50° C. comprising taking a petroleum pitch with a softening point above 100° C. and mixing it with a solvent to produce a pitch component with a softening point below 50° and thereafter blending with coal tar and an anti-wear agent to form a sealer base, and using the sealer base with conventional components of water, clay and emulsifier to produce driveway sealer having improved wear resistance as compared to like driveway sealer prepared without the anti-wear agent,
   wherein the anti-wear agent comprises a blend of alphatic carboxylic acids and aliphatic polyamides.

* * * * *